UNITED STATES PATENT OFFICE 1,941,771

PRODUCTION OF DIBENZANTHRONE

Herbert J. West, Crafton, Pa., assignor to The Selden Company, Pittsburgh, Pa., a corporation of Delaware No Drawing. Application August 2, 1929
Serial No. 383,166

10 Claims. (Cl. 260—61)

This invention relates to the production of dibenzanthrone compounds, and more particularly to the production of dibenzanthrone and isodibenzanthrone and the substitution products thereof.

Dibenzanthrone is a vat dye which is ordinarily produced by the condensation of two molecules of benzanthrone with caustic alkalies in the presence of reducing agents. It is of great importance, both as a dye and as an intermediate for the production of nitro- and aminodibenzanthrone. In its production by the fusion method referred to using the ordinary reducing agents such as dextrin, alcohols, and carbohydrates other than dextrin, it has been necessary to use a large excess of alkali and the product contains a high percentage of impurities. By the use of the aldehydic reducing agents such as furfural and its homologues described in the co-pending application of Lloyd C. Daniels, Serial No. 352,605, filed April 4, 1929, the amount of excess alkali is materially reduced. In any of these processes, however, the dibenzanthrones contain a considerable percentage of non-vattable material, which not only increases the amount of hydrosulfite necessary for vatting, but which causes the dyeings to appear weak and dull and lowers its value as an intermediate for the production of dibenzanthrone derivatives, some of which are even more valuable dyes.

In the past it has been necessary to remove these impurities by various methods of purification, such as filtration of the leuco-compound of the dye and subsequent aeration or by treatment of an alkali suspension of the crude dye with sodium hypochlorite. I have now found that these substances may be obtained in pure form or in a form in which the impurities are unobjectionable in vatting or more easily removed by adding oxidizing agents to the melt either before or during fusion or after the fusion has been continued sufficiently long to complete the formation of the dibenzanthrone.

Almost all the inorganic oxidizing agents are suitable for use in this manner. Oxides of the metal elements of the 4th, 5th, 6th, 7th, and 8th groups of the periodic system and their salts, as well as the alkali or alkaline earth metal salts of per-acids of the lower members of the 3rd, 5th and 6th groups, are suitable and nitrates and chlorates of the alkali metals have given particularly good results. In addition, peroxides of the alkali and alkaline earth metals as well as the salts of such per-acids as persulfuric acid and perboric acid are effective agents although in some cases it may be necessary to dilute them by mixing with inert material because of their powerful oxidizing action. Finally, oxidizing and reducing agents may be used simultaneously, the two being ground together and added to the caustic alkali together with the benzanthrone. In all cases it has been found that a much brighter dye is obtained on vatting and much less hydrosulfite is necessary.

As above stated, dibenzanthrones prepared by this method are in many cases suitable for use without purification, but it is one of the advantages of the present invention that when known methods of purification are to be used the addition of oxidizing agents facilitates the purification, lessens the time necessary, and produces a more complete removal of the impurities. For example, when filtration of the leuco-compound is to be carried out the addition of the oxidizing agents to the melt prevents the formation of colloidal substances which would render the filtration difficult and change those already formed into the crystalline state.

It is obvious that the present invention can also be used in the condensation of substituted benzanthrones. For example, when chlorbenzanthrone is fused with caustic and a reducing agent in the preparation of isodibenzanthrone, the use of oxidizing agents as described will not only destroy many of the impurities in the melt, but will tend to remove products which may themselves behave as vat dyes and produce an off color. It will be seen, therefore, that the process of the present invention is not only a method of purifying the fusion melt, but is in its broader aspects a step in the production of vat dyes from benzanthrones generally.

The following specific examples give a few typical embodiments of the present invention, but the invention is in no sense restricted to the details therein set forth.

Example 1

135 parts of KOH are fused with 8 parts of water, 1 part of dextrin is added and the mixture heated to 220° C.

27 parts benzanthrone ground with 10 parts dextrin are slowly added to the melt during ½ hour. The temperature is raised to 240° C. and held at this point for one hour.

8 parts of finely ground NaNO₃ are added cautiously and the heating continued at 230–240° C. for an hour longer. The melt is then dropped into water, filtered, washed free from alkali and dried.

Dyeings are obtained equal in strength and much brighter than those ordinarily produced by this type of dye.

*Example 2*

The process of Example 1 is followed, using 8 parts of NaClO$_3$ instead of NaNO$_3$. A pronounced rise of temperature occurs when the chlorate is first added.

Dyeings with the filtered and washed product are brighter but somewhat weaker than those obtained when the nitrate is used. Instead of sodium chlorate, sodium peroxide may be used with similar results.

*Example 3*

To 25 parts of KOH are added 1.5 parts water, 0.2 parts dextrin, and the requisite amount of V$_2$O$_5$. The mixture is heated to 220–230° C. and 5 parts benzanthrone and 1.5 parts dextrin are added. The temperature is raised to 240° C. and held for 45 minutes. The melt is poured into 2,000 parts of water, 2 parts hydrosulfite added, the solution heated to 70° C. and filtered, and the residue washed first with 0.25% NaOH solution containing a little hydrosulfite and then with pure water. The filtrate is aerated at 70° C., and the dye collected on a filter, washed and dried.

The amount of V$_2$O$_5$ to be added is that just sufficient to oxidize impurities and give a bright colored dye upon vatting. The exact amount is determined before-hand by experimental laboratory fusions and will vary from 0.5 to 1.5 parts by weight, depending on the amount and nature of the impurities.

Other metal oxides, such as SiO$_2$ or ZnO may be used in the same manner. The metal compound may be removed, if desired, by aerating the crude melt, filtering, washing and boiling the alkali-free precipitate with 1% HCl. The remaining product is then vatted and the non-dye filtered off, the filtrate aerated at 70° C. and the dye collected on a filter, washed and dried.

What is claimed as new is:

1. In a method for the production of dibenzanthrones by alkali fusion processes, the improvement which comprises adding oxidizing agents to the melt before dissolving it in water.

2. In a method for the production of dibenzanthrones by alkali fusion processes, the improvement which comprises adding oxidizing agents to the melt after the fusion has been continued sufficiently long to complete the formation of at least a part of the dibenzanthrone, but before dissolving the melt in water.

3. A process of producing dibenzanthrones, which comprises effecting the condensation of two molecules of a substance containing a compound including the benzanthrone radical with caustic alkali in the presence of an aldehydic reducing agent and adding an oxidizing agent to the melt before dissolving it in water.

4. A process of producing dibenzanthrones, which comprises effecting the condensation of two molecules of a substance containing a compound including the benzanthrone radical with caustic alkali in the presence of furfural and adding an oxidizing agent to the melt before dissolving it in water.

5. A process of producing dibenzanthrone dyestuffs, which comprises condensing two molecules of a benzanthrone substance by alkali fusion, adding an oxidizing agent to the melt before dissolving it in water and subsequently purifying the reaction product.

6. A process of producing dibenzanthrone dyestuffs, which comprises condensing two molecules of a substance containing a compound including the benzanthrone radical by alkali fusion, adding an oxidizing agent to the melt before dissolving it in water and subsequently purifying the reaction product by filtration.

7. A dibenzanthrone dyestuff essentially comprising the reaction product produced by condensing two molecules of a substance containing a compound including the benzanthrone radical by alkali fusion in the presence of an oxidizing agent added to the melt before the latter is dissolved in water.

8. A dibenzanthrone dyestuff essentially comprising the purified reaction product produced by condensing two molecules of a substance containing a compound including the benzanthrone radical by alkali fusion in the presence of an oxidizing agent added to the melt before the latter is dissolved in water and filtering the solution of the melt.

9. A dibenzanthrone dyestuff essentially comprising the reaction product produced by condensing at least two molecules of a substance containing a compound including the benzanthrone radical with caustic alkali in the presence of an aldehydic reducing agent, an oxidizing agent being present in the melt during at least a part of the fusion.

10. A dibenzanthrone dyestuff essentially comprising the reaction product produced by condensing at least two molecules of a benzanthrone substance with caustic alkali in the presence of furfural, an oxidizing agent being present in the melt during at least a part of the fusion.

HERBERT J. WEST.